No. 775,533. PATENTED NOV. 22, 1904.
T. J. HOLLINGSWORTH.
COTTON CHOPPER.
APPLICATION FILED JUNE 16, 1904.
NO MODEL. 2 SHEETS—SHEET 1.

Witnesses
M. C. Syddang
Jas. A. Koehl

Inventor
T. J. Hollingsworth
By H. B. Wilson
Attorney

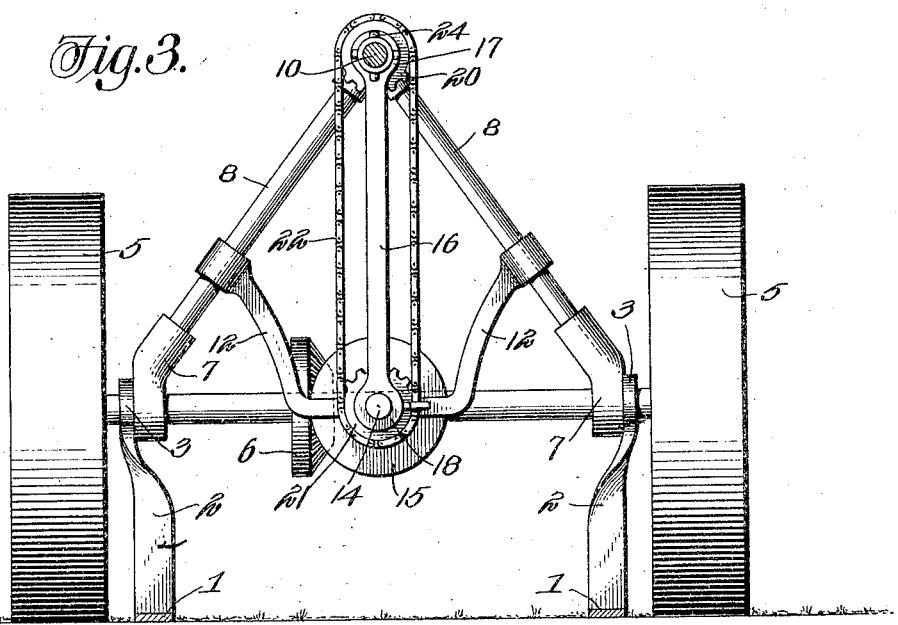
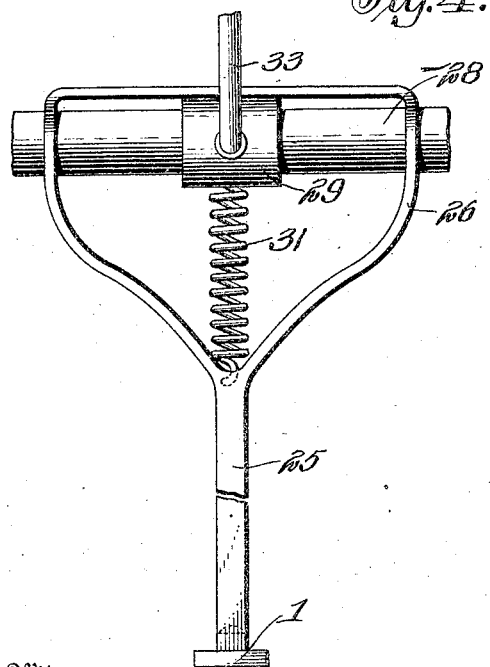
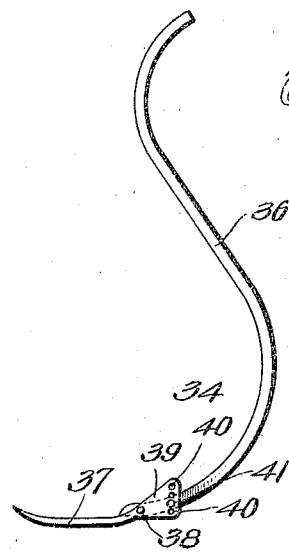

No. 775,533. Patented November 22, 1904.

UNITED STATES PATENT OFFICE.

THOMAS J. HOLLINGSWORTH, OF MAGAZINE, ARKANSAS.

COTTON-CHOPPER.

SPECIFICATION forming part of Letters Patent No. 775,533, dated November 22, 1904.

Application filed June 16, 1904. Serial No. 212,877. (No model.)

*To all whom it may concern:*

Be it known that I, THOMAS J. HOLLINGSWORTH, a citizen of the United States, residing at Magazine, in the county of Logan and State of Arkansas, have invented certain new and useful Improvements in Cotton-Choppers; and I do declare the following to be a full, clear, and exact description of the invention, such as will enable others skilled in the art to which it appertains to make and use the same.

My invention is an improved cotton-chopper adapted for use in chopping out superfluous plants in the cotton-drills and reducing them to "stands;" and it consists in the construction, combination, and arrangement of devices hereinafter described and claimed.

The object of my invention is to provide a cheap, simple, light, strong, and durable machine of this character having a revoluble chopper which may be readily adjusted both vertically and laterally by the operator to cause the chopper to work as deeply as may be required and to be adjusted to compensate for deviations in the cotton-drills.

Figure 1:
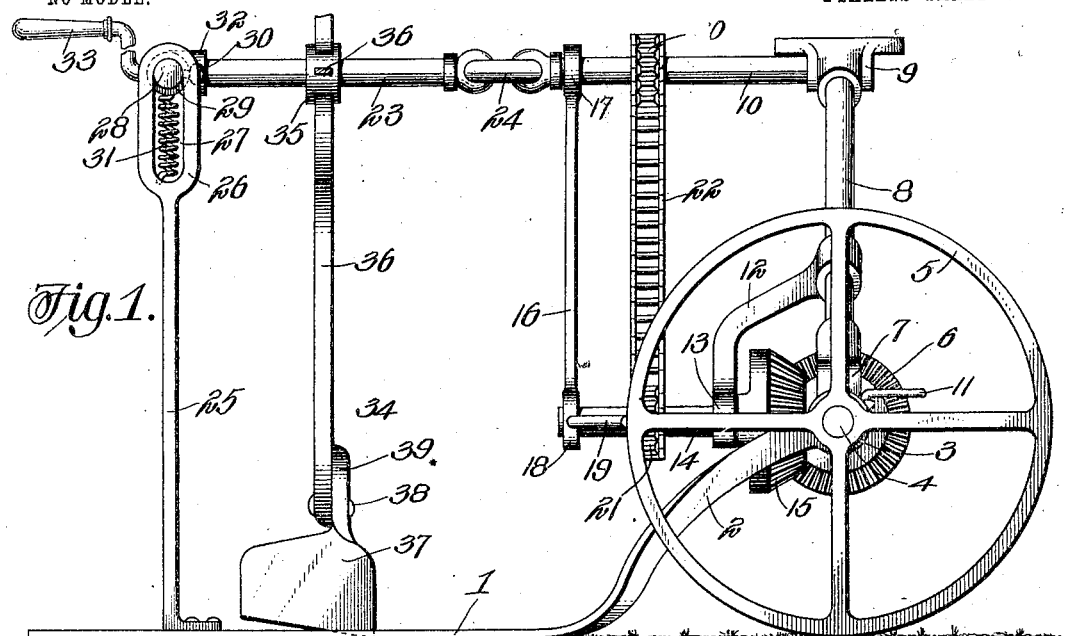
Figure 2:
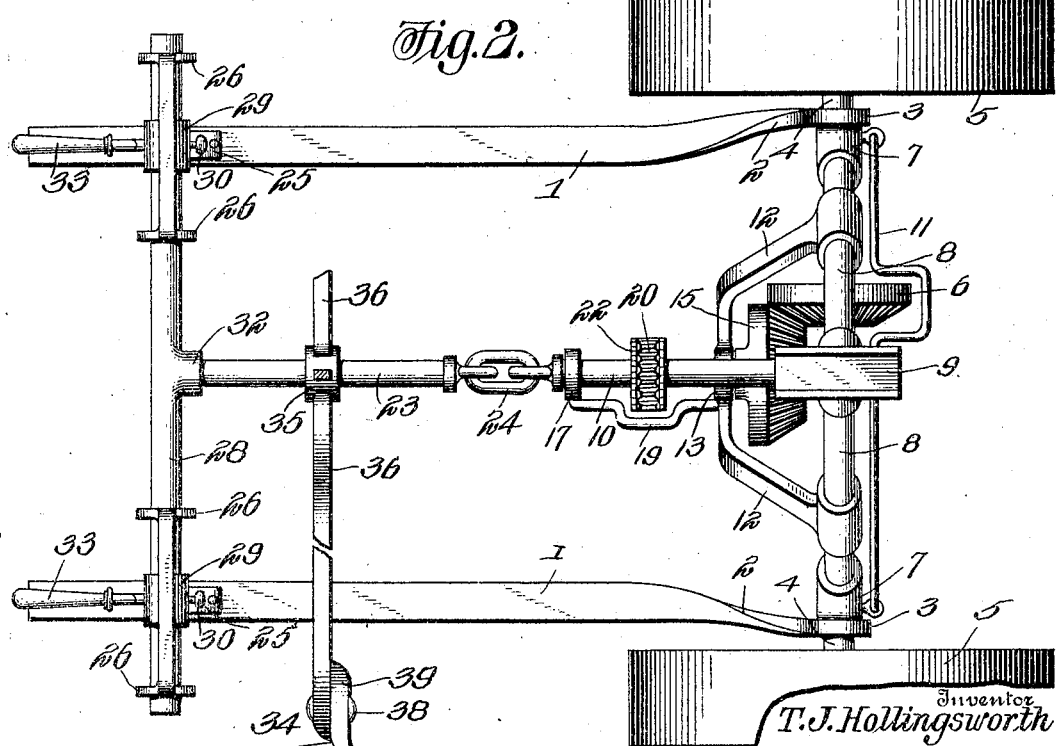

In the accompanying drawings, Figure 1 is a side elevation of the cotton-chopper embodying my improvements. Fig. 2 is a top plan view of the same. Fig. 3 is a rear elevation of the same. Figs. 4 and 5 are detail views.

The side runners 1 have forwardly and upwardly-extending arms 2, provided at their front sides with bearings 3 for a revoluble axle-shaft 4, to the ends of which are secured ground-wheels 5, with which it revolves. A miter-gear 6 is secured to the axle-shaft near its center. To the inner sides of the front ends of the said arms 2 are secured brackets 7, which serve to stiffen the runners, have eyes or bearings for the axle-shaft, and have sockets in their upper ends for the reception of a pair of upwardly-converging inclined bars 8, the upper ends of which are secured together by a head-piece 9. A shaft 10 of suitable length has its bearing in the head-piece and is free to revolve therein. The brackets 7 are connected together by a hitching-bar 11. A transversely-disposed brace 12 connects the inclined bars 8 together and has a bearing 13 for a shaft 14, which is provided at its front end with a miter-gear 15, which engages the miter-gear 6 on the axle-shaft. A standard 16 has a bearing 17 at its upper end for the rear portion of the shaft 10 and has a bearing 18 at its lower end for the rear end of the shaft 14. Said standard is supported by brace-rods 19, which extend rearwardly from the brace 12. The shafts 10 14 are respectively provided with sprocket-wheels 20 21, which are connected together by an endless sprocket-chain 22. To the rear end of the shaft 10 is connected the front end of a shaft 23 by means of a link 24, thus enabling the shaft 23 to be moved angularly with respect to the shaft 10 and to be also disposed in line therewith.

To the runners near their rear ends are secured standards 25, having yoke-heads 26 at their upper ends, the sides of which yoke-heads are provided with vertical slots 27. A transversely-disposed slide-bar 28 is placed in the said slots and is movable vertically therein and also longitudinally with respect to itself and transversely or laterally with respect to the machine. Sleeves 29 are secured on the said slide-bar by means of set-screws 30 and operate between the sides of the yoke-heads, the latter and the said sleeves limiting the lateral movement of the slide-bar. Supporting-springs 31, here shown as coiled extensile springs, have their lower ends attached to the yoke-heads at the forks of the sides thereof and their upper ends attached to the said sleeves. A bearing 32 for the rear end of the shaft 23 is carried by the slide-bar. Handle-bars 33 are attached to the said sleeves, and hence also to the slide-bar, to enable the latter to be moved vertically and laterally and the shaft 23 to be caused to describe corresponding angular movements.

On the shaft 23 is a chopper 34, which is revolved thereby. Said chopper comprises a hub member 35, arms 36, which are preferably curved, as here shown, and blades 37. The latter are pivoted to the arms, as at 38, and have adjusting-webs 39, which bear against the arms 36 and are provided with adjusting-openings 40. Suitable studs or screws 41 in appropriate openings 40 secure the chopping-blades to the arms 36 at any desired angle.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A cotton-chopper comprising a frame having supporting devices, an axle-shaft carried by the frame and having ground-wheels, a power-shaft geared to the axle-shaft and revolved thereby, a counter-shaft in fixed bearings, connections between the counter-shaft and the power-shaft, whereby the counter-shaft is rotated, a chopper-shaft forming a prolongation of and having one end flexibly connected to one end of the counter-shaft, said chopper-shaft being revoluble by the counter-shaft and movable angularly with respect thereto, a chopper carried and operated by the chopper-shaft, and means to support and adjust the angularly-movable chopper-shaft, substantially as described.

2. In a cotton-chopper the combination of runners, an axle-shaft journaled in bearings with which the runners are provided, ground-wheels on the axle-shaft to rotate the latter, upwardly-converging bars secured to the runners and having a head, a brace connecting said bars and having a bearing, a power-shaft disposed longitudinally between the runners, journaled in said bearing and geared to the axle-shaft, a standard supported by said braces and having a bearing for said power-shaft, a counter-shaft upon the power-shaft and journaled in bearings with which the head and standard are provided, connections between the power-shaft and the counter-shaft to rotate the latter, standards secured to the runners, a slide-bar movable vertically in said standards and transversely with respect to the runners, handle-bars connected to the slide-bar, a chopper-shaft flexibly connected to and revolved by the counter-shaft and having a bearing supported by the slide-bar, and a revoluble chopper carried by the chopper-shaft, substantially as described.

3. A cotton-chopper having a driven shaft in relatively fixed bearings, a chopper-shaft having one end flexibly connected to the driven shaft and rotated thereby, a bearing for the opposite end of the chopper-shaft, and means to shift said bearing both vertically and laterally, substantially as described.

In testimony whereof I have hereunto set my hand in presence of two subscribing witnesses.

THOMAS J. HOLLINGSWORTH.

Witnesses:
N. L. JOHNSTON,
R. B. ROBINSON.